(12) United States Patent
Seligmann

(10) Patent No.: US 7,206,837 B2
(45) Date of Patent: Apr. 17, 2007

(54) INTELLIGENT TRIP STATUS NOTIFICATION

(75) Inventor: Doree Duncan Seligmann, New York, NY (US)

(73) Assignee: Avaya Technology Corp., Basking Ridge, NJ (US)

( * ) Notice: Subject to any disclaimer, the term of this patent is extended or adjusted under 35 U.S.C. 154(b) by 678 days.

(21) Appl. No.: 10/287,151

(22) Filed: Nov. 4, 2002

(65) Prior Publication Data

US 2004/0088107 A1    May 6, 2004

(51) Int. Cl.
G06F 15/16    (2006.01)
(52) U.S. Cl. .................. 709/224; 340/988; 701/200
(58) Field of Classification Search ............. 701/204, 701/200, 25; 73/178 R; 340/988, 989, 994, 340/995.13, 991, 992, 993; 709/204, 224
See application file for complete search history.

(56) References Cited

U.S. PATENT DOCUMENTS

| | | | | |
|---|---|---|---|---|
| 5,428,544 A | * | 6/1995 | Shyu ........................ 701/117 |
| 5,563,608 A | * | 10/1996 | Tachita et al. ......... 342/357.14 |
| 5,568,390 A | * | 10/1996 | Hirota et al. ............... 701/201 |
| 5,959,577 A | * | 9/1999 | Fan et al. .............. 342/357.13 |
| 5,987,377 A | * | 11/1999 | Westerlage et al. ......... 701/204 |
| 6,006,159 A | * | 12/1999 | Schmier et al. ............. 701/200 |
| 6,317,686 B1 | * | 11/2001 | Ran .......................... 701/210 |
| 6,523,964 B2 | * | 2/2003 | Schofield et al. ........... 359/601 |
| 6,700,692 B2 | * | 3/2004 | Tonar et al. ................. 359/265 |
| 2001/0034624 A1 | * | 10/2001 | Niwa ............................ 705/5 |
| 2002/0069017 A1 | * | 6/2002 | Schmier et al. ............. 701/213 |
| 2002/0099500 A1 | * | 7/2002 | Schmier et al. ............. 701/200 |

* cited by examiner

Primary Examiner—William Vaughn
Assistant Examiner—Greg Bengzon
(74) Attorney, Agent, or Firm—DeMont & Breyer, LLC

(57) ABSTRACT

Methods of providing trip status information periodically to a user in transit to a destination are disclosed. Trip status information comprises information and alerts based on estimates of various time-of-arrival metrics, such as expected time-of-arrival and earliest time-of-arrival. The estimates are based on a plurality of data, including calendrical time (the time and date), historical statistics, average speed, current weather, weather forecasts, current traffic, and traffic forecasts.

6 Claims, 4 Drawing Sheets

INTELLIGENT TRIP STATUS NOTIFICATION

FIELD OF THE INVENTION

The present invention relates to transportation in general, and, in particular, to methods of providing trip status information to a user in transit to a destination.

BACKGROUND OF THE INVENTION

FIG. 1 depicts a representational diagram of a user 140 in transit from a source location 110 to a destination location 120, in which user 140 carries a mobile communications device 145 while in transit. User 140 might use any mode of travel to get from source 110 to destination 120, such as walking, automobile, train, airplane, etc. In the prior art, if user 140 wishes to estimate his/her time-of-arrival at destination 120, he/she can consider, in concert with the current time, information such as (i) how long it has normally taken in the past to get to destination 120 from user 140's current position; (ii) user 140's average speed; (iii) the distance remaining to destination 120; (iv) traffic; (v) weather; (vi) expected traffic for the remainder of the trip; and (vii) expected weather for the remainder of the trip.

User 140 might estimate item (i) through (vii) above, respectively, based on: (i) memory; (ii) an odometer, speedometer, or global positioning system (GPS), as is well understood in the art; (iii) an odometer, GPS, or observational approximation (e.g., based on a landmark, road sign, etc.); (iv/v) observation; (vi/vii) forecasts received via radio, mobile communications device 145, etc.

It is apparent, therefore, that estimating the time-of-arrival can be an inconvenient and cumbersome task, particularly if user 140 wishes to periodically recalculate the time-of-arrival as the trip progresses. Furthermore, in some instances at least one of the data items mentioned above might not be available, for example, due to: poor radio reception; commercial radio weather and traffic reports provided only sporadically; poor signal quality for mobile communications device 145; no data capability for mobile communications device 145; inability to read odometer/speedometer (e.g., chartered-bus passenger, etc.)

In addition, in some situations it might be dangerous to perform such time-of-arrival estimates; for example, an automobile driver may not pay sufficient attention to the road while he/she (i) is performing mental calculations, or (ii) fumbling with the radio, navigation system, or mobile communications device 145 to receive traffic and weather information. Finally, it might be desirable for a user to receive metrics in addition to the expected time-of-arrival, such as the earliest (best-case) time-of-arrival, or a pessimistic time-or-arrival (e.g., mean plus one standard deviation, etc.). Such additional metrics might also be inconvenient and/or difficult to estimate mentally, if not more so than the expected time-of-arrival. Therefore, the need exists for an automated method that overcomes these disadvantages.

SUMMARY OF THE INVENTION

The present invention enables a user to automatically receive trip status information while in transit to a destination location. In particular, the illustrative embodiment comprises methods for periodically providing trip status information based on time-of-arrival metrics (e.g., expected time remaining in the trip, an alert indicating a sufficiently high probability (say, 70%) of being late, etc.). The present invention thus overcomes the many disadvantages of a user attempting to repeatedly estimate time-of-arrival during a trip.

A novel feature of the present invention is its use of the calendrical time (i.e., the time and date) for estimating time-of-arrival metrics. The use of calendrical time is crucial for making accurate estimates, as is apparent when one considers, for example, the differences in mean, variance, etc. for the time required to drive from Baltimore, Md. to the U.S. Patent Office at the following times:
1:00 PM on a Wednesday afternoon
4:00 PM on a Wednesday afternoon
4:00 PM on a Friday afternoon
4:00 PM on the Friday before the Columbus Day 3-day holiday weekend
4:00 PM on the Wednesday before Thanksgiving While the illustrative embodiment is disclosed in the context of a handheld mobile communications device (e.g., cellular dataphone, PDA, pager with text, etc.) delivering trip status information to a user, it will be appreciated by persons skilled in the art that an alternative delivery mechanism (e.g., an automobile dashboard, etc.) could deliver such information. In addition, it will be clear to persons skilled in the art how to implement the methods of the present invention in various apparatuses (e.g., a processor in a remote server, a processor in a mobile communications device, etc.).

The illustrative embodiment comprises a method for providing status information to a mobile communications device's user, wherein the user is in transit to a destination, the method comprising: (i) receiving the location of the mobile communications device; (ii) estimating at least one time-of-arrival metric based on: (a) the mobile communication device's location, (b) the calendrical time at the mobile communication device's location, (c) the user's mode of travel, and (d) historical travel time data; and (iii) sending a signal to the mobile communications device based on the time-of-arrival metrics.

DETAILED DESCRIPTION

Figure 1:
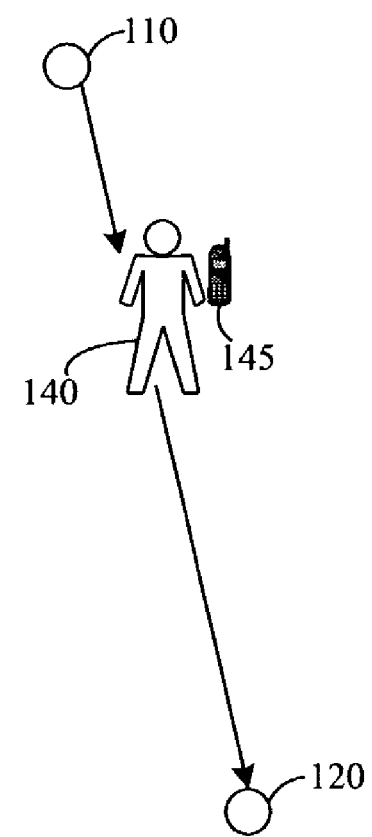
FIG. 1 depicts a representational diagram of user 140 in transit from source location 110 to destination location 120.
Figure 2:
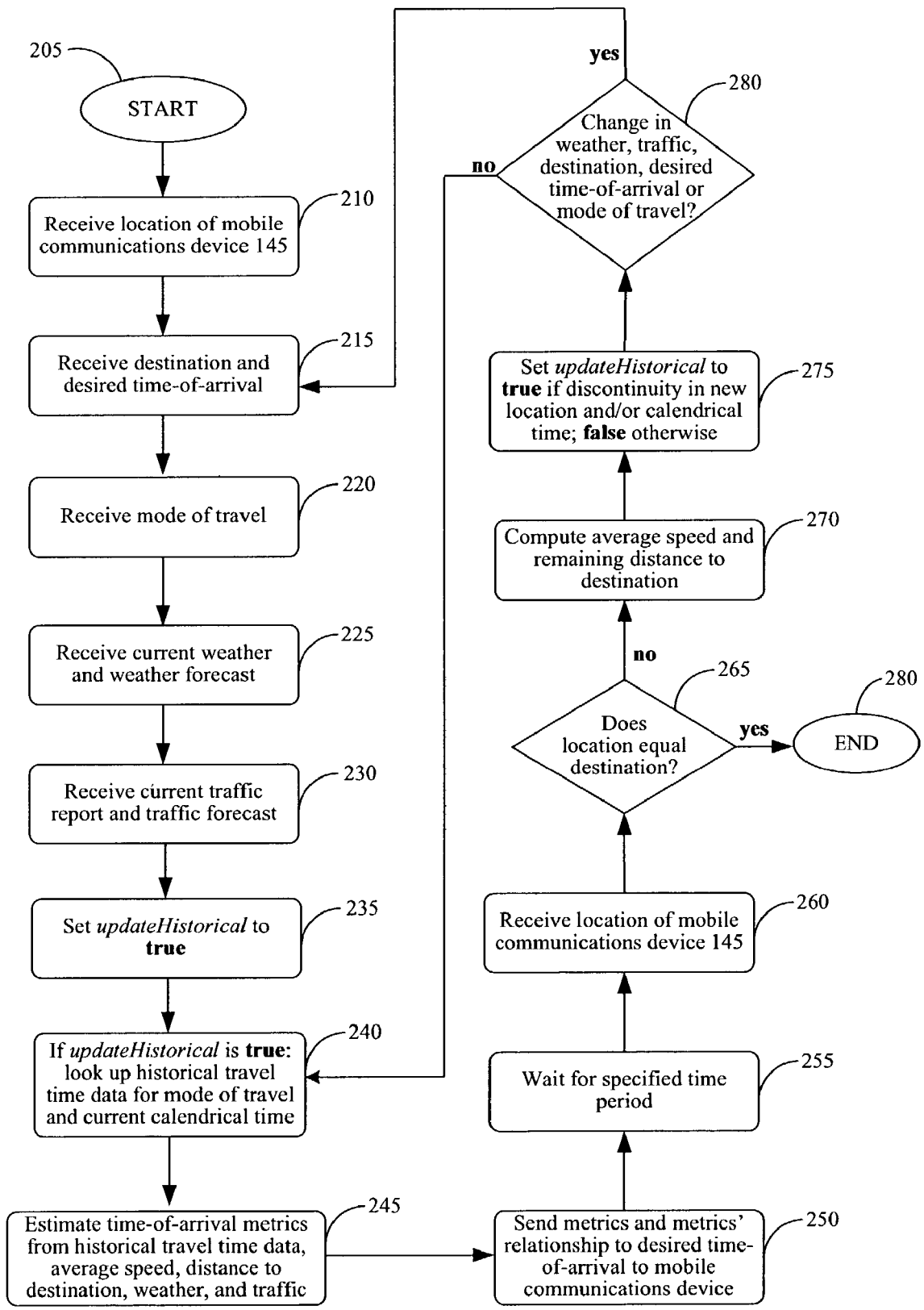
FIG. 2 depicts a flowchart of a method for providing status information for single-segment trips, in accordance with the illustrative embodiment of the present invention.

FIG. 2 depicts a flowchart of a method for providing status information for single-segment trips, in accordance with the illustrative embodiment of the present invention.

At task 210, the location of mobile communications device 145 is received. In some embodiments, a GPS receiver in mobile communications device 145 is employed for this purpose. As is well understood in the art, alternative methods of determining location might be employed in other embodiments.

At task 215, the destination and the desired time-of-arrival are received. In some embodiments, mobile communications device 145 has a keypad through which the user inputs this information. As is well understood in the art, alternative methods of receiving this information, such as speech recognition, might be employed in other embodiments.

At task 220, the mode of travel is received. In some embodiments, mobile communications device 145 provides a menu through which the user inputs this information. As is well understood in the art, alternative methods of receiving this information, such as speech recognition, might be employed in other embodiments.

At task 225, the current weather and weather forecast is received. In some embodiments, mobile communications device 145 might receive this information from a dedicated radio-based weather data service, or from a query to an Internet web site (e.g., weather.com, etc.), as is well understood in the art.

At task 230, the current traffic and traffic forecast is received. In some embodiments, mobile communications device 145 might receive this information from a dedicated radio-based traffic data service, or from a query to an Internet web site (e.g., the web site of a local radio station, etc.), as is well understood in the art.

At task 235, boolean flag updateHistorical is set to true.

At task 240, if flag updateHistorical is true, a lookup of historical travel time data is performed, based on the mode of travel and the current calendrical time. In some embodiments, communications device 145 might submit one or more queries to a database residing on a remote server. In some embodiments, the database could be a traditional relational database with tables of historical travel time data for various combinations of start and destination locations, modes of travel, and calendrical time categories (e.g., rush hour, holiday, off-peak, etc.) based on mode of travel. In some embodiments, the historical travel time data might include statistics such as expected trip time and standard deviation of a normal probability distribution, as is well understood in the art, or alternative parameters (e.g., minimum and maximum trip times, etc.) according to a different type of probability distribution. In some other embodiments, in lieu of a relational database, historical travel time data might be embedded in a spatial database, as is well known in the art.

At task 245, time-of-arrival metrics are estimated based on the historical travel time data, average speed, remaining distance to the destination, weather information, and traffic information. (Computation of the average speed and the remaining distance to the destination is disclosed below in the description of task 270; note that average speed does not apply at the start of the trip.) In some embodiments, adjustments to the historical travel time data might be made based on weather information, traffic information, and average speed. The remaining distance to the destination can be used for interpolation, given that the travel time database cannot have infinite spatial resolution. Time-of-arrival metrics that might be estimated include: expected time-of-arrival, earliest time-of-arrival, time-of-arrival bounds for a given confidence interval, etc. In some embodiments, the computations of task 245 might be performed at a remote server, while in other embodiments, the computations of task 245 might be performed by a processor embedded in mobile communications device 145, as is well understood in the art.

At task 250, the computed time-of-arrival metrics are sent to mobile communications device 145, as well as the relationship between these metrics and the desired time-of-arrival (e.g., early, late, very late, etc.) In some embodiments, the computations of task 245 might be performed at a remote server and transmitted wirelessly to mobile communications device 145, while in other embodiments, the computations of task 245 might be performed by a processor embedded in mobile communications device 145, thus requiring no transmission.

At task 255, a time delay occurs. The duration of the time delay could be, for example: specified by the user, computed automatically based on the estimated trip time (e.g., at every 5% mark in time or distance, etc.); adjusted dynamically based on how early/late the user is, etc.

At task 260, the current location of mobile communications device 145 is received, as in task 210.

At task 265, it is determined whether the location received at task 260 is the destination. If so, the method terminates; otherwise, the method continues at task 270.

At task 270, the average speed and remaining distance to the destination are computed. Remaining distance can be computed based on the location received at task 260 and the destination location. In some embodiments, average speed might be computed from the distance traveled and the time elapsed since the beginning of the trip; alternatively, the average speed over a recent time interval (i.e., a moving average, as is well known in the art) might be computed.

At task 275, it is determined whether the new location received at task 260, compared to the previous location received, represents a "discontinuity". For example, a user traveling by automobile, from Crystal City, Va. to Columbia, Md. would experience a discontinuity when getting on to or off of the Beltway, in which case it might be appropriate to perform an updated lookup of the historical travel time database (discussed below). Similarly, a discontinuity in time can result from the time delay of task 255. For example, consider an automobile trip from Boston, Mass. to Crystal City, Va., in which the time delay is fixed at 30 minutes. Driving on the Beltway at 4:00 PM can be very different from 3:30 PM, and thus might require an updated lookup of the historical travel time database, as the user would be driving on the Beltway during rush hours instead of off-peak. (In some embodiments, the time-of-arrival metrics might be computed based on interpolating accordingly between off-peak and rush-hour historical data.) Flag updateHistorical is set in task 275 to indicate whether at least one of these two discontinuities has occurred.

At task 280, it is determined whether there has been a change in weather, traffic, destination, desired time-of-arrival, or mode of travel, compared to before the time delay. If so, the method continues execution at task 215 (where this new information is subsequently received, as described above); otherwise, the method continues execution at task 240, described above. In both cases new historical travel time data will be obtained, if appropriate, at task 240, described above, for the next iteration of the method.

Figure 3:
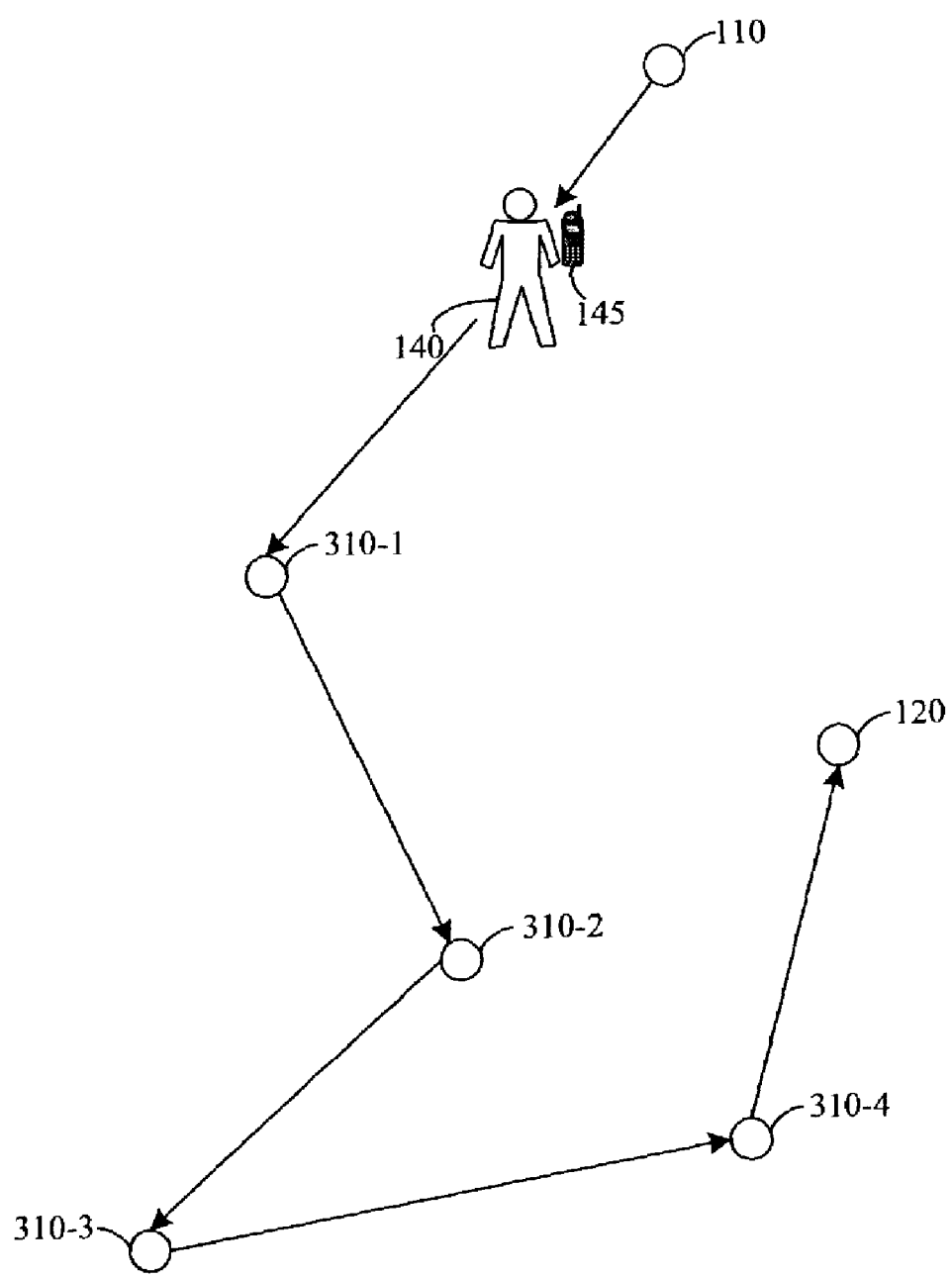
FIG. 3 depicts a representational diagram of user 140, as shown in FIG. 1, in transit from source location 110, as shown in FIG. 1, to destination location 120, as shown in FIG. 2, via intermediate points 310-1 through 310-4.

FIG. 3 depicts a representational diagram of user 140, in transit from source location 110 to destination location 120 via intermediate points 310-1 through 310-4. Such a multi-segment trip could represent, for example, the following: a user drives an automobile from his home in New Jersey to a train station (first segment); rides a train to New York City's Penn Station (second segment); walks from Penn Station to Herald Square (third segment); and rides a subway from Herald Square to Rockefeller Center (fourth segment). Thus, each segment of the trip has an associated mode of travel, as well as starting and ending locations.

Figure 4:
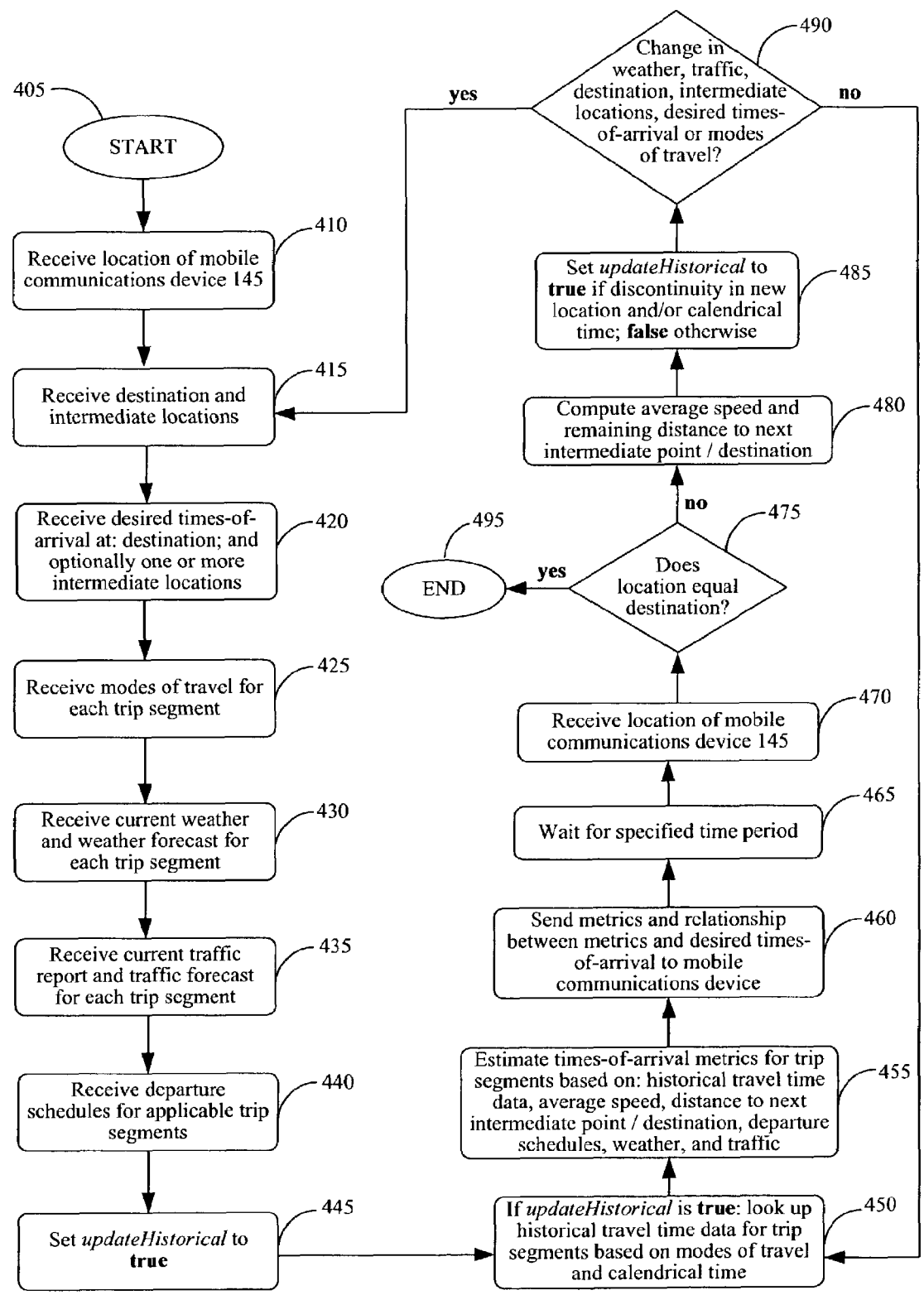
FIG. 4 depicts a flowchart of a method for providing status information for multi-segment trips, in accordance with the illustrative embodiment of the present invention.

FIG. 4 depicts a flowchart of a method for providing status information for single-segment trips, in accordance with the illustrative embodiment of the present invention.

At task 410, the location of mobile communications device 145 is received. In some embodiments, a GPS receiver embedded in mobile communications device 145 might be employed for this purpose, while in some other embodiments, alternative methods for determining location, as are well-known in the art, might be employed.

At task 415, the destination and the intermediate points are received. In some embodiments, mobile communications device 145 has a keypad through which the user inputs this information. As is well understood in the art, alternative methods of receiving this information, such as speech recognition, might be employed in other embodiments.

At task 420, the times-of-arrival at the destination, and optionally at one or more intermediate locations, is received, as at task 415. Whether or not the user assigns a time-of-arrival to an intermediate location might be based on: the mode of travel and departure schedule for a particular segment (for example, a train that leaves only once an hour); or perhaps for another reason (for example, a user might wish to arrive at a train station by 3:50 PM, even though a train leaves every five minutes, if the fare is higher starting at 4 PM).

At task 425, the modes of travel for each trip segment is received. In some embodiments, mobile communications device 145 provides a menu through which the user inputs this information. As is well understood in the art, alternative methods of receiving this information, such as speech recognition, might be employed in other embodiments.

At task 430, the current weather and weather forecast for each trip segment is received. In some embodiments, mobile communications device 145 might receive this information from a dedicated radio-based weather data service, or from queries to an Internet web site (e.g., weather.com, etc.), as is well understood in the art.

At task 435, the current traffic and traffic forecast for each trip segment is received. In some embodiments, mobile communications device 145 might receive this information from a dedicated radio-based traffic data service, or from a query to an Internet web site (e.g., the web site of a local radio station, etc.), as is well understood in the art.

At task 440, departure schedules for applicable trip segments are received (the motivation for considering departure schedules in estimating time-of-arrival at the destination is apparent from the description of task 420 above). In some embodiments, mobile communications device 145 might receive the departure schedules from a query to an Internet web site (e.g., njtransit.org, etc.), as is well understood in the art.

At task 445, boolean flag updateHistorical is set to true.

At task 450, if flag updateHistorical is true, a lookup of historical travel time data for in-progress and remaining trip segments is performed, based on the mode of travel and the current calendrical time, as in task 240 of the first method.

At task 455, time-of-arrival metrics for trip segments are estimated based on the historical travel time data, average speed, remaining distance to the destination, weather information, and traffic information, as in task 245 of the first method. In addition, the time-of-arrival metrics are based on the departure schedules received in task 440.

At task 460, the computed time-of-arrival metrics, and their relationship to the desired time-of-arrivals, are sent to mobile communications device 145, as in task 250 of the first method.

At task 465, a time delay occurs, as in task 255 of the first method.

At task 470, the current location of mobile communications device 145 is received, as in task 410.

At task 475, it is determined whether the location received at task 470 is the destination. If so, the method terminates; otherwise, the method continues at task 480.

At task 480, the average speed and remaining distance to the next intermediate point or destination are computed, as in task 270 of the first method.

At task 485, flag updateHistorical is set accordingly to indicate whether the new location and/or time represents a discontinuity over the previous location and time, as in task 275 of the first method.

At task 490, it is determined whether there has been a change in weather, traffic, intermediate points, destination, desired times-of-arrival, or modes of travel. If so, the method continues execution at task 415 (where this new information is subsequently received, as described above); otherwise, the method goes continues execution at task 450. In both cases, new historical travel time data will be obtained, if appropriate, at task 450, described above, for the next iteration of the method.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   (i) receiving a location of a mobile communications device that is in transit to a destination;
   (ii) estimating the time-of-arrival bounds for said mobile communications device at said destination for a confidence interval based on:
   (a) said location, and
   (b) at least one historical travel time statistic; and
   (iii) sending the time-of-arrival bounds to said mobile communications device.

2. The method of claim 1 wherein said historical travel time statistic comprises at least one of:
   a minimum value;
   a maximum value;
   a variance;
   an nth-order moment, wherein n is an integer greater than 2; and
   a probability distribution.

3. The method of claim 1 wherein said estimating is also based on at least one of:
   current weather information;
   current traffic information;
   forecasted weather;
   forecasted traffic; and
   a metric of said user's speed over a time interval.

4. The method of claim 1 wherein said mode of travel is selected from the group consisting of: automobile, private watercraft, private aircraft, snowmobile, skateboard, roller skates, skiing, ambulating, and swimming.

5. The method of claim 1 wherein said mode of travel is selected from the group consisting of: bus, train, commercial watercraft, commercial aircraft, and spacecraft; and
   wherein said estimating is also based on a departure schedule for said mode of travel.

6. The method of claim 1 wherein said user specifies a desired time-of-arrival, and wherein the expected time-of-arrival and the time-of-arrival bounds is also based on said desired time-of-arrival.

\* \* \* \* \*